(12) United States Patent
Hubert et al.

(10) Patent No.: US 11,901,786 B2
(45) Date of Patent: Feb. 13, 2024

(54) STATOR FOR AN ELECTRIC MACHINE HAVING INSULATION PAPER FOR A STATOR WINDING

(71) Applicant: Dr. Ing. h.c. F. Porsche Aktiengesellschaft, Stuttgart (DE)

(72) Inventors: Thomas Hubert, Leonberg (DE); Stefan Schmidt, Stuttgart (DE); Joerg Schneider, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/585,604

(22) Filed: Jan. 27, 2022

(65) Prior Publication Data

US 2022/0255387 A1 Aug. 11, 2022

(30) Foreign Application Priority Data

Feb. 10, 2021 (DE) ...................... 10 2021 103 062.5

(51) Int. Cl.
*H02K 3/34* (2006.01)
*H02K 3/48* (2006.01)
*H02K 3/30* (2006.01)

(52) U.S. Cl.
CPC ............... *H02K 3/345* (2013.01); *H02K 3/30* (2013.01); *H02K 3/48* (2013.01); *H02K 2213/03* (2013.01)

(58) Field of Classification Search
CPC ............ H02K 3/30; H02K 3/34; H02K 3/345; H02K 3/48; H02K 2213/03
(Continued)

(56) References Cited

U.S. PATENT DOCUMENTS 5,929,550 A * 7/1999 Kaminski ................ H02K 3/48
310/216.069
10,559,992 B2 2/2020 Iwaki
(Continued)

FOREIGN PATENT DOCUMENTS

DE 102017214195 A1 2/2019
JP S 58170334 A 10/1983
(Continued)

OTHER PUBLICATIONS

Kira et al., English Machine Translation of JP-2014220123-A (Year: 2014).*
(Continued)

*Primary Examiner* — Rashad H Johnson
(74) *Attorney, Agent, or Firm* — LEYDIG, VOIT & MAYER, LTD.

(57) ABSTRACT

A stator for an electric machine provided for purely electrically driving a motor vehicle is provided with a stator body forming stator grooves, a stator winding through which current can flow, which engages in the respective stator groove and axially protrudes from the stator groove, for forming an electromagnetic rotating field and an insulation paper, which is provided in the stator groove between the stator winding and the stator body, for electrically insulating the stator winding from the stator body, wherein the insulation paper protrudes from the stator groove, wherein the insulation paper is provided with an additional layer on the surface thereof for providing a higher creepage resistance compared to the surface of the insulation paper without the additional layer.

20 Claims, 1 Drawing Sheet

(58) Field of Classification Search
USPC .......................................................... 310/215
See application file for complete search history.

(56) References Cited

U.S. PATENT DOCUMENTS

| | | | |
|---|---|---|---|
| 10,978,219 B2* | 4/2021 | Tomizawa | ............... H01B 7/02 |
| 2005/0101695 A1 | 5/2005 | Wada et al. | |
| 2015/0035406 A1 | 2/2015 | Huang et al. | |
| 2017/0133968 A1 | 5/2017 | Takahashi | |
| 2018/0026073 A1* | 1/2018 | Tsuboi | ............. H01L 27/14806 |
| | | | 257/225 |
| 2018/0262073 A1 | 9/2018 | Takagi et al. | |
| 2019/0229594 A1* | 7/2019 | Kuemmlee | ............ H02K 3/505 |
| 2021/0036568 A1* | 2/2021 | Schulz | ..................... H02K 3/12 |
| 2022/0255387 A1* | 8/2022 | Hubert | ..................... H02K 3/30 |
| 2022/0311291 A1* | 9/2022 | Eilenberger | ........... H02K 1/165 |

FOREIGN PATENT DOCUMENTS

| | | | |
|---|---|---|---|
| JP | 2014220123 A | * | 11/2014 |
| JP | 2014220123 A | | 11/2014 |
| JP | 2015076906 A | | 4/2015 |
| JP | 2016174441 A | | 9/2016 |
| JP | 2017055534 A | | 3/2017 |
| JP | 2020510283 A | | 4/2020 |

OTHER PUBLICATIONS

Definition of 'Layer', https://www.merriam-webster.com/dictionary/layer (Year: 2023).*
Gerald Friederici, "Bedeutung der Kriechstromfestigkeit von Isolierstoffen für Entwickler", https://www.cmc.de/blog/know-how-5/post/bedeutung-der-kriechstromfestigkeit-von-isolierstoffen-fur-entwickler-172, Sep. 29, 2020, pp. 1-4, CMC Klebetechnik GmbH, Frankenthal, Germany.

* cited by examiner

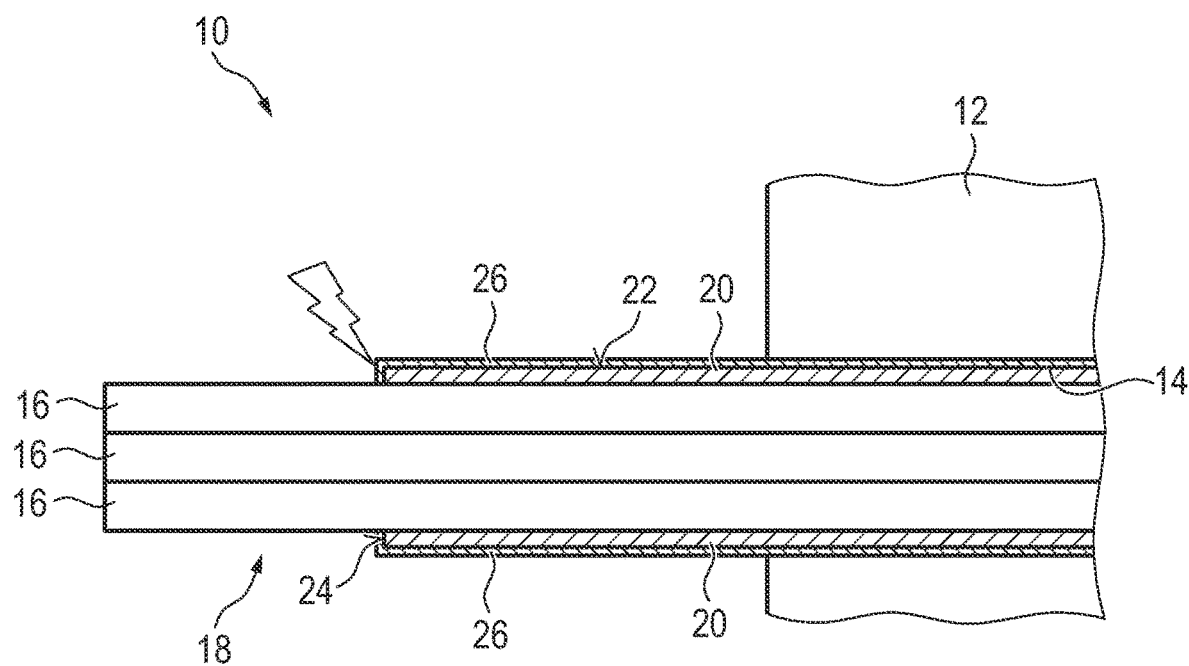

STATOR FOR AN ELECTRIC MACHINE HAVING INSULATION PAPER FOR A STATOR WINDING

CROSS REFERENCE TO RELATED APPLICATIONS

This application claims benefit to German Patent Application No. DE 10 2021 103 062.5, filed on Feb. 10, 2021, which is hereby incorporated by reference herein.

FIELD

The invention relates to a stator, using which an electric machine provided for purely electrically driving a motor vehicle can be assembled.

BACKGROUND

DE 10 2017 214 195 A1 discloses lining a stator groove of a stator for an electric machine with an insulation paper in order to electrically insulate windings incorporated in the stator groove, wherein the insulation paper protrudes out of the stator groove in the axial direction.

There is a constant need to reduce the installation space for electric machines without adversely affecting the electrical safety.

SUMMARY

In an embodiment, the present disclosure provides a stator for an electric machine provided for purely electrically driving a motor vehicle, comprising a stator body forming a plurality of stator grooves, a stator winding through which current can flow, which engages a respective stator groove of the plurality of stator grooves and axially protrudes from the stator groove, for forming an electromagnetic rotating field, and an insulation paper, which is provided in the stator groove between the stator winding and the stator body, for electrically insulating the stator winding from the stator body, wherein the insulation paper protrudes from the stator groove, wherein the insulation paper is provided with an additional layer on a surface of the insulation paper for providing a higher creepage resistance compared to the surface of the insulation paper without the additional layer.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1: shows a schematic sectional view of a part of a stator.

DETAILED DESCRIPTION

It is the object of the invention to indicate measures that make an installation-space-saving and safe electric machine possible.

The object is achieved according to the invention by way of a stator having the features disclosed herein. Configurations of the invention are specified in the claims and in the following description, which may in each case individually or in combination represent an aspect of the invention.

One aspect of the invention relates to a stator for an electric machine provided for purely electrically driving a motor vehicle, having a stator body forming stator grooves, a stator winding through which current can flow, which engages in the respective stator groove and axially protrudes from the stator groove, for forming an electromagnetic rotating field, and an insulation paper, which is provided in the stator groove between the stator winding and the stator body, for electrically insulating the stator winding from the stator body, wherein the insulation paper protrudes from the stator groove, wherein the insulation paper is provided with an additional layer on the surface thereof for providing a higher creepage resistance compared to the surface of the insulation paper without the additional layer.

The stator body, which is designed in particular as a laminated core, can have, preferably rib-shaped, teeth, which project in the radial direction and between which the respective stator groove is formed. When the stator is provided for an electric machine designed as an inner rotor, the teeth project radially inwards while the stator grooves can be open radially towards the inside. When the stator is provided for an electric machine designed as an outer rotor, the teeth project radially outwards while the stator grooves can be open radially towards the outside. The stator windings composed of electrical conductors, in particular enameled wire, can be fed through the respective stator grooves in the axial direction, wherein the stator windings can be axially fed out of the respective stator groove at an axial side or at both axial sides. For the expected electrical boundary conditions, the insulation paper provided in the stator groove provides a sufficient dielectric strength with respect to a voltage breakdown between the stator winding and the stator body.

In the case of an electric machine provided for purely electrically driving a motor vehicle, as a rule, the insulation paper, together with the stator windings, emerges somewhat from the respective stator group in the axial direction. This makes it necessary to design the insulation paper not only with respect to the dielectric strength thereof but also with respect to the axial extent thereof outside of the stator groove in order to prevent creepage currents. It has been identified that, in particular in the case of purely electrically driven motor vehicles, a significantly higher power density leads to higher currents and/or voltages in the electric machine, which can make the design of the axial extent of the insulation paper outside of the stator groove a design factor that determines the axial installation space. Owing to the additional layer, the electrical resistance with respect to a creepage current at the surfaces of the insulation paper that are formed by the additional layer can be significantly higher than at a surface of the insulation paper when the additional layer is not provided in this area. Owing to the additional layer, the material property of the insulation paper with respect to the creepage resistance can be improved, as a result of which the axial extent of the insulation paper outside of the stator groove can accordingly be reduced and/or the reliability with respect to the occurrence of creepage currents can be increased with dimensions remaining the same. The axial installation space requirement of the stator and the material use required for the stator windings can likewise be reduced by way of a reduction of the axial extent of the groove paper. This can lead to reduced production costs. Owing to the additional layer which leads to a higher creepage resistance, the axial extent of the insulation paper and of the stator can be reduced, with the result that an electric machine that saves installation space and is safe is made possible.

In particular, the insulation paper has a higher creepage resistance outside of the stator groove than inside the stator groove owing to the additional layer. In principle, it is possible to provide the additional layer at an outer side facing toward the stator body and an inner side of the insulation paper facing toward the stator winding and over the entire axial extent of the insulation paper such that the majority of the surface or even the entire surface of the insulation paper is formed by the additional layer. However, it has been identified that the critical path for a possibly occurring creepage current lies in the transition region of the winding, insulation paper and stator laminated core. The creepage current is therefore preferably formed by the part of the winding over the top side of the insulation paper towards the stator end side, which part is not surrounded by insulation paper. It is therefore already sufficient if the insulation paper has the increased creepage resistance, which is achieved by way of the additional layer, only outside of the stator groove. The material use for the additional layer as well as the installation space requirement of the insulation paper within the stator groove can be kept to a minimum.

In one embodiment, the additional layer is provided only outside of the stator groove. As a result, the additional layer is applied only to that part of the axial extent of the insulation paper that is located outside of the stator groove. The material use for the additional layer as well as the installation space requirement of the insulation paper within the stator groove can be kept low as a result.

Provision can be made for the additional layer to be provided only on an outer side of the insulation paper facing away from the stator winding or only both on an outer side facing away from the stator winding and on an end side of the insulation paper facing away from the stator body. As a result, the additional layer is essentially provided only in those areas of the insulation paper in which a creepage current would be most likely be expected.

In particular, the additional layer belongs at least to the insulating material group Ma or to the insulating material group II according to IEC 60112 using solution A. In this insulating material group, a sufficiently high creepage resistance is provided in order to use the stator for an electric machine that is intended to be used for a purely electrically driven sports car. It is also possible that the additional layer belongs to the insulating material group I according to IEC 60112 using solution A, wherein such a high creepage resistance is possibly not necessary from a cost aspect. In the IEC 60112 standard, the creepage resistance is assessed based on the CTI value, which is determined in a droplet method. In this case, in a specific electrode arrangement defined in the standard, between two platinum electrodes which have been machined with a bevelled edge, a prescribed number of droplets of a prescribed liquid ("solution A") of a prescribed droplet size is applied in a prescribed period between the electrodes to the workpiece that is to be tested. The CTI value for the creepage path formation, based on which the workpiece is divided into the insulating material groups, is the determined numerical value of the highest test voltage in volts that the workpiece withstands under fixed conditions without creepage path formation.

The additional layer preferably has a CTI value of $\geq 175$, in particular $175 \leq CTI \leq 800$ and preferably $400 \leq CTI \leq 600$ according to IEC 60112 using solution A. In the case of a creepage resistance defined using said CTI value, a sufficiently high creepage resistance is provided in order to use the stator for an electric machine that is intended to be used for a purely electrically driven sports car.

A surface of the insulation paper without the additional layer preferably belongs to the insulating material group II or the insulating material group Ma according to IEC 60112 using solution A. The insulation paper that is different from the additional layer can be selected with respect to the dielectric strength thereof and not with respect to the creepage resistance thereof. In this respect, for reasons of cost, a correspondingly lower creepage resistance can be provided for the surfaces of the insulation paper that are not formed by the additional layer.

In particular, the additional layer is produced from a plastic, such as PE, PTFE, PBT, and/or a resin, such as epoxy resin, polyester resin. As a result, a sufficient creepage resistance can be achieved for the additional layer using a comparatively cost-effective material.

Provision is preferably made for the insulation paper to bear against the stator winding and/or to be adhesively bonded to the stator winding. This can prevent the insulation paper from coming off the stator winding, ripping and/or folding, as a result of which the creepage resistance provided could be adversely affected.

The insulation paper is preferably pressed onto the stator body. The volume within the stator groove can thereby be filled by the stator winding to the greatest possible amount.

In particular, the additional layer is applied to the insulation paper as a coating. As a result, the material used for the additional layer and the production costs can be kept low.

The stator 10 partly illustrated in FIG. 1 can be used for an electric machine of a purely electrically driven sports car. The stator 10 has a stator body 12, which is composed of a laminated core and which has stator grooves 14 which are open in a radial direction and in the axial direction, into which a plurality of stator windings 18 having electrical conductors 16 are inserted. The stator windings 18 axially project out of the respective stator groove 14 and from there are fed to another stator groove 14. In order to prevent an electrical breakdown between the stator winding 18 and the stator body 12, an insulation paper 20, which has a sufficiently high dielectric strength, is provided between the stator winding 18 and the stator body 12.

The insulation paper 20 projects in the axial direction, in particular in a manner bearing against the stator winding 18, out of the stator groove 14. On an outer side 22 facing toward the stator body 12 and where applicable on an axial end side 24 facing away from the stator body 12, the insulation paper 20 has an additional layer 26, which has a significantly higher creepage resistance in comparison to the rest of the insulation paper 20. Owing to the high creepage resistance of the additional layer 26, a creepage path from a top side of the stator winding 18 facing toward the insulation paper 20 over the axial end side 24 and the outer side 22 of the additional layer 26 to an end surface of the stator body 12 can be shortened, as a result of which the axial extent of the portion of the insulation paper 20 provided outside of the stator groove 14 and thus also the axial installation space requirement of the stator 10 can be reduced without adversely affecting the electrical safety.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A stator for an electric machine provided for purely electrically driving a motor vehicle, comprising:
    a stator body forming a plurality of stator grooves,
    a stator winding through which current can flow, which engages a respective stator groove of the plurality of stator grooves and axially protrudes from the stator groove, for forming an electromagnetic rotating fields, and
    an insulation layer including an insulation paper and an additional layer separate from the insulation paper provided on a surface of the insulation paper, which is provided in the stator groove between the stator winding and the stator body, for electrically insulating the stator winding from the stator body, wherein the insulation layer protrudes from the stator groove,
    wherein the additional layer provides a higher creepage resistance compared to the surface of the insulation paper without the additional layer.

2. The stator as claimed in claim 1, wherein the insulation layer has a higher creepage resistance outside of the stator groove than inside the stator groove owing to the additional layer.

3. The stator as claimed in claim 1, wherein the additional layer is provided only outside of the stator groove.

4. The stator as claimed in claim 1, wherein the additional layer is provided only on an outer side of the insulation paper facing away from the stator winding or only both on an outer side facing away from the stator winding and on an end side of the insulation paper facing away from the stator body.

5. The stator as claimed in claim 1, wherein the additional layer belongs at least to the insulating material group Ma or to the insulating material group II according to IEC 60112 using solution A.

6. The stator as claimed in claim 1, wherein the additional layer has a CTI value of ≥175 according to IEC 60112 using solution A.

7. The stator as claimed in claim 1, wherein a surface of the insulating paper without the additional layer belongs to the insulating material group II or to the insulating material group Ma according to IEC 60112 using solution A.

8. The stator as claimed in claim 1, wherein the additional layer is produced from a plastic.

9. The stator as claimed in claim 8, wherein the additional layer is produced from epoxy resin or polyester resin.

10. The stator as claimed in claim 8, wherein the plastic is PE, PTFE, PBT, and/or a resin.

11. The stator as claimed in claim 1, wherein the insulation paper bears against the stator winding and/or is adhesively bonded to the stator winding.

12. The stator as claimed in claim 1, wherein the insulation paper is pressed onto the stator body.

13. The stator as claimed in claim 1, wherein the additional layer has a CTI value such that $175 \leq CTI \leq 800$ according to IEC 60112 using solution A.

14. The stator as claimed in claim 1, wherein the additional layer has a CTI value such that $400 \leq CTI \leq 600$ according to IEC 60112 using solution A.

15. The stator as claimed in claim 1, wherein the additional layer is configured to be applied to the insulation paper as a coating.

16. The stator as claimed in claim 1, wherein the additional layer covers an axial end of the insulation paper.

17. The stator as claimed in claim 16, wherein the additional layer forms a corner around the axial end of the insulation paper.

18. A stator for an electric machine provided for purely electrically driving a motor vehicle, comprising:
    a stator body forming a plurality of stator grooves,
    a stator winding through which current can flow, which engages a respective stator groove of the plurality of stator grooves and axially protrudes from the stator groove, for forming an electromagnetic rotating field, and
    an insulation paper, which is provided in the stator groove between the stator winding and the stator body, for electrically insulating the stator winding from the stator body, wherein the insulation paper protrudes from the stator groove,
    wherein the insulation paper is provided with an additional layer on a surface of the insulation paper for providing a higher creepage resistance compared to the surface of the insulation paper without the additional layer, and
    wherein the additional layer is configured to be applied to the insulation paper as a coating.

19. A stator for an electric machine provided for purely electrically driving a motor vehicle, comprising:
    a stator body forming a plurality of stator grooves,
    a stator winding through which current can flow, which engages a respective stator groove of the plurality of stator grooves and axially protrudes from the stator groove, for forming an electromagnetic rotating field, and
    an insulation paper, which is provided in the stator groove between the stator winding and the stator body, for electrically insulating the stator winding from the stator body, wherein the insulation paper protrudes from the stator groove,
    wherein the insulation paper is provided with an additional layer on a surface of the insulation paper for providing a higher creepage resistance compared to the surface of the insulation paper without the additional layer, and
    wherein the additional layer covers an axial end of the insulation paper.

20. The stator as claimed in claim 19, wherein the additional layer forms a corner around the axial end of the insulation paper.

* * * * *